United States Patent [19]

Hilbert et al.

[11] 4,051,532
[45] Sept. 27, 1977

[54] AUXILIARY SIGNAL PROCESSING CIRCUIT FOR TELEVISION RECEIVERS

[75] Inventors: Francis H. Hilbert, Addison; Theodore S. Rzeszewski, Lombard, both of Ill.

[73] Assignee: Matsushita Electric Company of America, Franklin Park, Ill.

[21] Appl. No.: 588,250

[22] Filed: June 19, 1975

[51] Int. Cl.² .............................................. H04N 7/08
[52] U.S. Cl. .................................................. 358/142
[58] Field of Search ........ 178/5.6 R, 5.8 R, DIG. 23; 358/15, 142

[56] References Cited

U.S. PATENT DOCUMENTS

| 2,951,904 | 9/1960 | Blan .................... 178/5.6 R |
| 3,069,492 | 12/1962 | D'Agostini .................... 178/5.1 |
| 3,456,071 | 7/1969 | Jackson et al. .............. 178/DIG. 23 |
| 3,637,926 | 1/1972 | Morchand .................... 178/5.6 R |
| 3,700,793 | 10/1972 | Borsuk et al. ................. 178/6.8 |
| 3,725,571 | 4/1973 | Justice ................. 178/DIG. 23 X |
| 3,842,196 | 10/1974 | Loughlin ..................... 178/5.8 R X |
| 3,857,999 | 12/1974 | Justice ................. 178/DIG. 23 X |
| 3,924,060 | 12/1975 | Bedford ............................. 358/142 |

Primary Examiner—John C. Martin
Assistant Examiner—Aristotelis M. Psitos
Attorney, Agent, or Firm—Drummond, Nelson & Ptak

[57] ABSTRACT

A low level video auxiliary signal is transmitted in addition to the conventional composite black and white or color television signal. The auxiliary signal is in the form of redundant, opposite-polarity signal portions during pairs of time successive signal portions, such as horizontal lines or fields of the composite television signal. The auxiliary signal also may be transmitted in the form of a predetermined frequency with the auxiliary information on successive lines of the composite television signal being out of phase by one-half the period of the auxiliary signal frequency. When the composite signal is detected and displayed by the conventional circuitry in the receiver, the auxiliary information is visually cancelled in the image displayed on the cathode ray tube and the normal video information is displayed. Additional circuitry is employed in the receiver to effect cancellation of the conventional video information from the display and to reinforce successive portions of the auxiliary signal; so that the auxiliary signal is displayed on the cathode ray tube of the receiver when desired.

8 Claims, 6 Drawing Figures

AUXILIARY SIGNAL PROCESSING CIRCUIT FOR TELEVISION RECEIVERS

BACKGROUND OF THE INVENTION

In television transmission systems, either black and white or color, the video and audio information along with synchronizing signal components are transmitted as part of a composite signal. It is desirable to include additional information beyond the picture and sound information presently transmitted for the purpose of channel identification, subtitles for deaf persons, special notices and the like. A number of proposals have been made for adding auxiliary signals to the present composite television signals to convey this additional information.

In order to conserve the limited frequency spectrum space which is available for the transmission of signals in the portion of the spectrum allocated to television transmission, it is desirable to transmit such auxiliary information within the same frequency band already occupied by the present composite television signal alone.

Auxiliary signal systems have been devised for permitting the transmission of information in addition to the conventional video and sound signals. Most of the prior art systems result in noticeable degradation of the video information carried by the television signal, do not operate at a sufficiently high data rate to be very useful in conveying the additional information, or are unreliable.

Some prior art systems use an approach in which entire frames or fields of the television signal are replaced with frames or fields of an auxiliary image representative signal which may be detected and displayed in a separate receiver. Such systems, however, are subject to a substantial data rate limitation. In addition, they cause serious degradation of the normal television signal, because the removal of the normal signal, and its replacement with the auxiliary signal, interferes with the reproduction of the normal signal on the cathode ray tube of the receiver.

Another technique which has been employed is to add auxiliary signal information to the television signal during the blanking intervals. This is known as a time sequencing system, and, once again, it is subject to substantial data rate limitations or reliability problems because of the very short time available during the blanking intervals for transmitting the auxiliary information.

A system has been proposed for transmitting an add-on signal with the frequency band occupied by the normal television signal, where, during successive line intervals, the add-on signal is reversed in polarity or phase and is identically repeated during such successive line intervals. Thus, the add-on signal tends to visually cancel when the composite received signal is processed and displayed by a conventional television receiver. A separate add-on signal processor then is provided for alternately inverting successive lines of the received composite signal to display the add-on signal and cancel the normal television video signal from the display of the add-on processor. This system, however, requires the additional display unit of the add-on processor along with a separate signal processing system which duplicates to a large extent of the system of a conventional television receiver. This system does, however, have an advantage inasmuch as degradation of the conventional or normal television signal reproduced by television receivers is minimized.

Another prior art system which has been employed utilizes a 3.58 Mhz sub-carrier signal (the conventional color sub-carrier signal) to convey auxiliary information in a black and white television receiver or to carry the additional auxiliary information in a color television receiver. Circuitry is employed for detecting the auxiliary signal information and adding it to the normal video information in the receiver. The auxiliary information, however, is simultaneously displayed along with the conventional video information, so that substantial visual interference between the two exists on the face of the cathode ray tube of the television receiver. As a consequence, in order to have a highly visible auxiliary signal which overrides the conventional video display, it is necessary to employ high amplitude auxiliary signals. When this is done, the possibility of increasing the interference between these signals and the desired conventional television signals is substantially increased.

It is desirable to add auxiliary video signals to the normal or conventional television signal for display on the face of the television receiver cathode ray tube on deman, where the auxiliary signals are transmitted within the same bandwidth as the conventional signal, and where degradation of the conventional television signal is minimized during periods when the auxiliary signal is not being displayed.

SUMMARY OF THE INVENTION

Accordingly, it is an object of this invention to provide an improved auxiliary signal processing circuit for television signal systems.

It is an additional object of this invention to provide auxiliary video information in a television signal, which may be reliably detected and displayed on the picture tube of a television receiver when desired, with a minimum of degradation of the normal television signal at all other times.

It is another object of this invention to provide a minimum number of additional components in a television receiver for the purpose of detecting an auxiliary video signal and displaying such auxiliary signal on the cathode ray tube of the receiver.

It is a further object of this invention to provide a television receiver with additional circuitry for processing and displaying auxiliary signal components on demand with substantial cancellation of the normal video signal during the time the auxiliary video components are displayed.

In accordance with a preferred embodiment of this invention, a television receiver is arranged to display conventional television signals and auxiliary television signals on the cathode ray tube thereof. The conventional television signals comprise a composite signal containing video information and synchronizing signal components, and the auxiliary signal components comprise alternating signal portions containing opposite-polarity, redundant information during successive ones of the signal portions thereof. The receiver includes processing circuitry for producing a video signal on the cathode ray tube wherein the redundant, opposite-polarity auxiliary signal portions are substantially cancelled from the display on the cathode ray tube during normal operation of the receiver because of visual integration. A switching circuit is selectively operated and responds to at least some of the synchronizing signal components of the composite television signal to process the composite signal and the auxiliary signal portions to cause the normal video information of the television signal to tend to be cancelled and to cause the redundant auxiliary signal portions to be reinforced. Thus, the auxiliary signal portions are reproduced on the cathode ray tube and the normal video information is substantially cancelled from the display.

DETAILED DESCRIPTION

Figure 1:
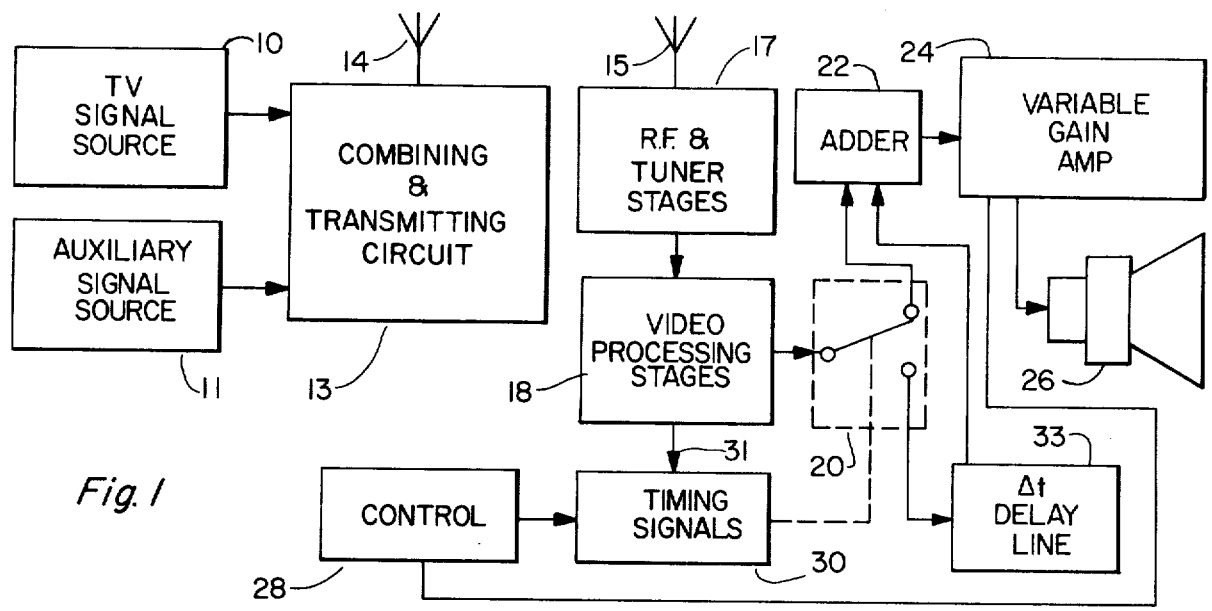
FIG. 1 is a block diagram of a preferred form of the invention.

Referring now to the drawings, like or similar components in the various figures are given the same reference numbers.

FIG. 1 is a block diagram of a television transmission and receiving system built in accordance with a preferred embodiment of the invention. The system includes a conventional black and white or color television signal source 10 at the transmitting station, and, in addition, an auxiliary signal source 11. The signal source 10 is utilized to produce a conventional television picture and the accompanying sound, while the auxiliary signal source 11 is used to produce auxiliary signals which relate to or accompany the conventional television signals from the souce 10. Typically, the auxiliary signal source 11 may be used to continuously produce the channel identifying number for the transmitting station at which it is used. Or, the source 11 may be employed to generate time or temperature indicia, new flashes, etc.

The signals from both the conventional signal source 10 and the auxiliary signal source 11 are supplied to a combining and transmitting circuit 13 which supplies a composite television signal including the conventional black and white or video information, luminance information, sound information and synchronizing signal components. These portions of a composite television signal are well known. In addition, the auxiliary signals from the source 11 are supplied within the frequency band of the conventional signal and the combined signals are transmitted from the antenna 14 of the transmitter.

To minimize mutual interference between the auxiliary signals from the source 11 and the conventional video signals obtained from the television signal source 10, the auxiliary signals preferably are transmitted in a low energy portion of the frequency band and are of relatively low amplitude compared to the amplitude of the conventional video signal components. In addition, the auxiliary signal components are transmitted in the form of alternating signal portions containing opposite-polarity, redundant information during successive ones of such signal portions. The alternate signal portions may be successive horizontal lines of the television signal or successive fields of the television signal.

Figure 4:
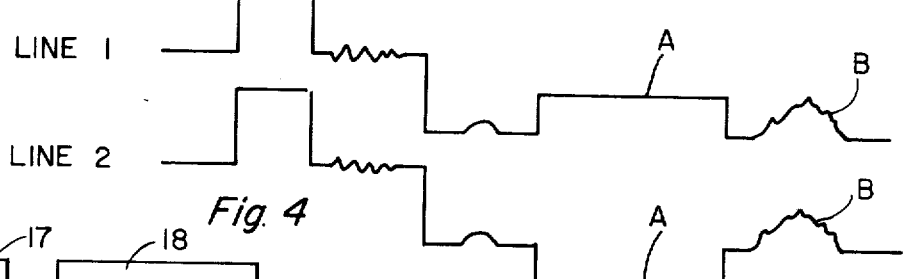
FIG. 4 shows waveforms useful in describing the operation of the circuit of FIG. 3.
Figure 6:
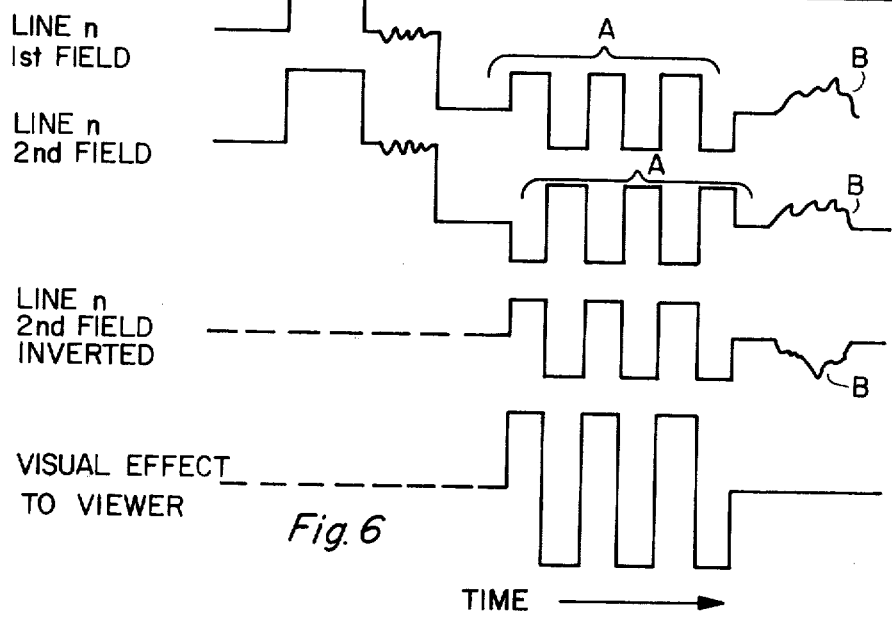
FIG. 6 shows waveforms useful in describing the operation of the circuit of FIG. 5.

The creation of the opposite-polarity auxiliary signal information may be accomplished by inverting every other line or field of the portion of the signal having the auxiliary information in it. This technique is illustrated in FIGS. 4 and 6. Another technique which may be used to obtain the opposite-polarity redundancy is illustrated in the upper two waveforms of FIG. 2 which are labeled "line 1" and "line 2", respectively. Here the auxiliary signal is transmitted on a low visibility frequency, a portion of the waveform of which is shown following the synchronizing and blanking pulse intervals in each of the upper two waveforms of FIG. 2. On line 1 (and all other odd-numbered lines), the low visibility frequency signals are as illustrated. On line 2 (and all even-numbered lines), the low visibility signals are delayed (or advanced) relative to the information transmitted on the odd-numbered lines by one-half the period of the auxiliary signal frequency. This results in the auxiliary signals on one line being 180° out of phase with the auxiliary signals on the next preceding or next successive line.

When a conventional television receiver receives such a signal, the net effect on the cathode ray tube screen is that the auxiliary signals cancel; and the eye of the viewer performs a spatial integration or averaging which effectively cancels out the auxiliary signal background. This is particularly effective since the auxiliary signal is transmitted as a low amplitude signal relative to the conventional video signal which is reproduced by the receiver.

At the receiver, the composite television signal, including the auxiliary signals, is received on a conventional antenna 15. The signals from the antenna 15 are supplied to conventional R.F. and tuner stages 17 and to conventional black and white or color video processing stages 18 of the receiver. The signals from the output of the video processing stages 18 then are supplied to a switching circuit 20 whichd is added to a conventinal television receiver. The switching circuit 20 is shown diagrammatically as a single-poled, double-throw switch, the upper position of which is its normal, stable position. In this position, the combined composite processed video signals, including all of the alternating phase auxiliary signal components as well as the normal video signal components, are supplied through an adder circuit 22 (which may be a simple hard-wired OR gate or a more complex OR gate capable of passing analog signal components). The output of the adder 22 is supplied to an amplifier 24, which may be a variable gain amplifier having its gain normally adjusted to a conventional level for processing the conventional video signal components supplied to it from the video processing stages 18. The video signal components then are supplied to the cathode ray tube 26 for reproduction on the screen in a conventional manner.

Figure 2:
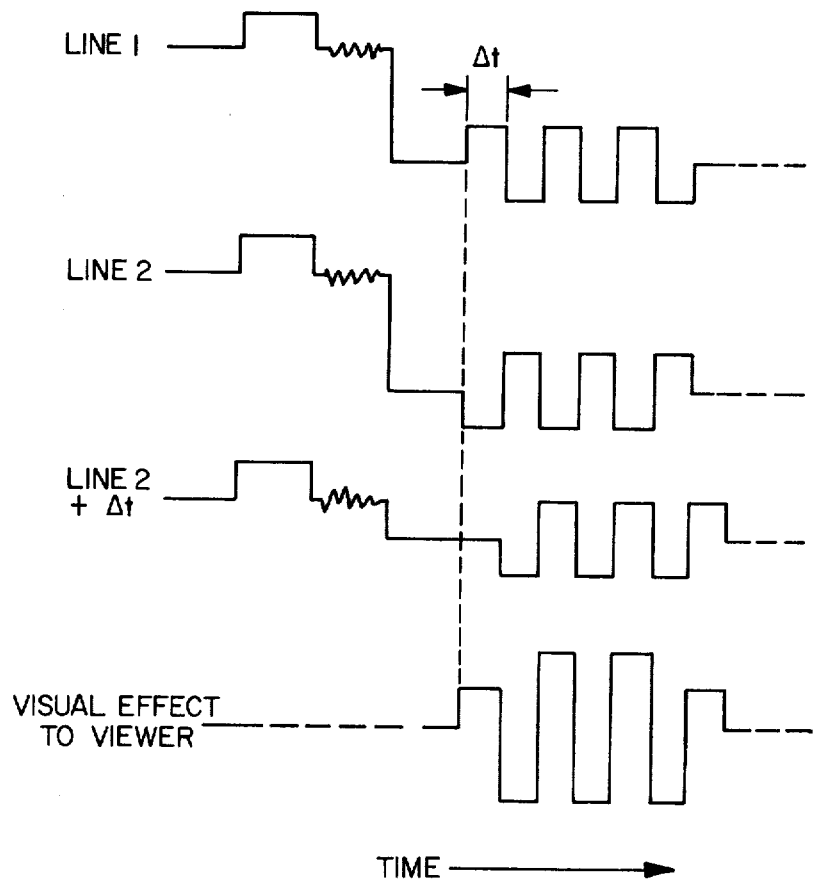
FIG. 2 shows waveforms useful in describing the operation of the circuit of FIG. 1.

If the auxiliary signals are of the type illustrated in FIG. 2, when the switch 20 is in its upper position as shown in FIG. 1, the auxiliary signal components tend to visually cancel one another since the redundancy from line to line of these out-of-phase components is integrated by the eye of the viewer to result in effective cancellation of the components. As a consequence, the picture which is viewed on the screen of the cathode ray tube 26 is a conventional picture.

Now assume that it is desired to view the auxiliary signals on the cathode ray tube 26. This can be initiated in a number of different ways, but for the purposes of this description, assume that it is effected by a control circuit 28. This circuit may be a simple push-button activated by the viewer, or it may be operated in conjunction with a channel changing switch to cause control signals to be applied from its outputs for a predetermined time interval following its operation. One of these signals is applied to the variable gain amplifier circuit 24 to increase the gain of this circuit. Variable gain amplifiers are well known. For example, the gain change can be implemented rather simply by merely bypassing emitter degeneration with a capacitor when the additional gain is required. The signal from the control circuit 28 applied to the amplifier 24 will accomplish this purpose. This is done to increase the gain of the low level auxiliary signals so that the auxiliary signals may be more easily viewed on the screen of the cathode ray tube 26.

Operation of the control circuit 28 also enables a timing signal supply circuit 30 which is supplied with timing signals in the form of synchronizing pulses on the input lead 31 at the horizontal line frequency. These pulses on the lead 31 can be produced by the horizontal synchronizing signal separator circuitry and may be any signal present in the television receiver used to indicate the commencement or ending of each horizontal line. Alternatively, an additional sunchronizing pulse could be placed on the "front porch" of the horizontal synchronizing pulse on alternate lines to specifically identify whether the horizontal line is an "odd" or an "even" line. With the embodiment shown in FIG. 1, this is not particularly important; but identification of odd or even lines may be more significant in conjunction with the embodiments shown in FIGS. 3 and 5.

Irrespective of the source of the synchronizing signals at the horizontal line rate which are applied on the lead 31, these signals are processed in the timing signal circuit 30 which is enabled by the control circuit 28 to cause the switch 20 to alternately shift between the upper position shown in the drawing and its lower position in synchronism with each successive synchronizing pulse applied on the head 31 and processsed by the timing signal circuit 30. The circuit 30 and the switch 20 may take a number of suitable forms. For example, the timing signal circuit 30 could be a gated bistable multivibrator which is enabled for operation by the control circuit 28 and which is toggled each time a horizontal synchronizing pulse is applied over the lead 31. The outputs of such a bistable multivibrator then could be used to control a pair of transmission gates in the switch circuit 20 to alternately direct the output of the video processing stages 18 through the upper and lower outputs of the circuit 20 on alternate horizontal lines of the received television signals.

When the switch 20 is in its lower position, the signals at the output of the video processing stages 18 are passed through a delay line 33 which has a delay time (Δt) equal to one-half the period of the auxiliary signal shown in lines 1 and 2 of FIG. 1. The delay is imparted only to every other line due to the action of the switch 20, as described previously. Thus, if the odd-numbered lines are undelayed (line 1 of FIG. 2), and the even-numbered lines are supplied through the delay line 33, the even-numbered lines now are in synchronism with the odd-numbered lines, causing the visual effect to the viewer of the auxiliary data reinforcing, as shown in the lowermost waveform of FIG. 2. This causes the auxiliary signal to be observable on the face of the cathode ray tube 26.

As stated previously, if desired, a variable gain amplifier 24 may be employed; so that the signal gain is increased when the auxiliary signal is observable on the cathode ray tube 26. In the circuit shown in FIG. 1, however, this also amounts to increasing the gain of the video signal which may be undesirable. If this is the case, the variable gain amplifier 24 could be eliminated from the circuit shown in FIG. 1.

In the circuit of FIG. 1, the auxiliary signals are displayed along with the conventional video signals since the slight amount of delay (Δt), which is imparted to alternate lines by the delay line 33, does not have much effect on many of the conventional video signals. Some cancellation of some components of the conventional video signal will occur; but by and large, degradation or cancellation of the conventional video signal is not signficant with the circuit of FIG. 1.

Figure 3:
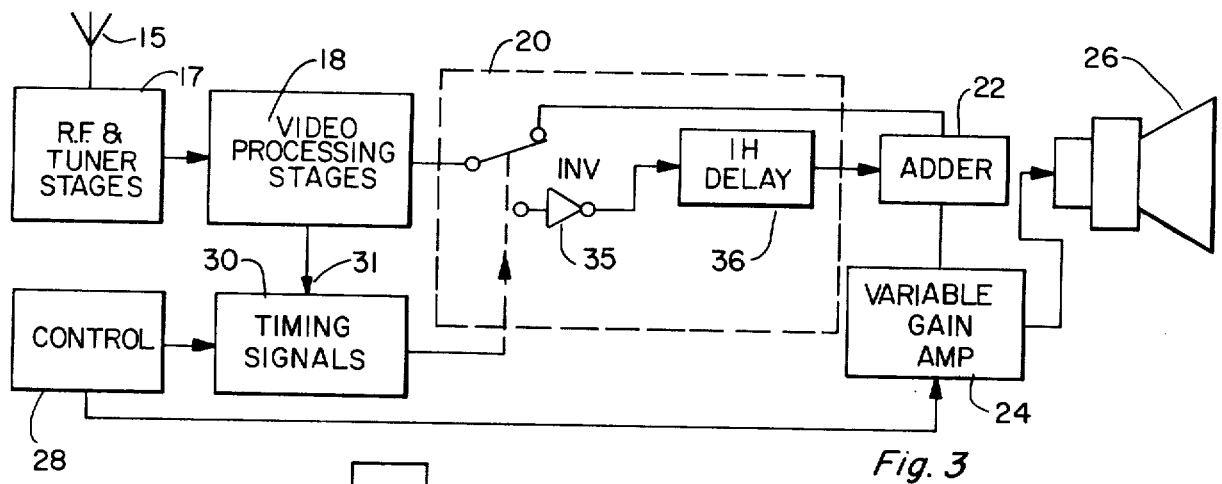
FIG. 3 is a block diagram of another embodiment of the invention.

The circuit shown in FIG. 3 operates in substantially the same manner as the circuit of FIG. 1, except that every other horizontal line of the received signal is inverted when the control circuit 28 is activated to cause the timing signal circuit 30 to operate the switch 20. The circuit of FIG. 3 is used in conjunction with a composite television signal of the type shown in FIG. 4. In this system, the odd-numbered horizontal lines of the composite television signal have the auxiliary signal information "A" of one phase, while the even-numbered lines (line 2 of FIG. 4) have the auxiliary information "A" inverted or 180° out of phase with that of the odd-numbered lines. The video information "B" and the synchronizing pulse information is of the same phase in all lines, as in conventional television composite signals.

Thus, when the circuit of FIG. 3 is operated to receive normal television signals, the switch 20 is in the position shown, and the alternate lines of the composite signal as shown in FIG. 4 are applied through the adder 22 and the variable gain amplifier 24 to the cathode ray tube 26. The conventional video information "B" is reinforced on the cathode ray tube 26 and may be observed. The auxiliary information "A" as shown in lines 1 and 2 of FIG. 4, however, is in opposite-polarity, and the eye of the viewer tends to integrate this information and cancel it out, so that it is not observable. As stated previously, this effect is further enhanced by the fact that the auxiliary information "A" is of relatively low amplitude compared to the conventional or normal video information content of the signal.

In FIG. 4, the waveform portion "A" has been exaggerated in amplitude for the purposes of illustration and also is shown as a single wide pulse; so that the phase effects can be more readily ascertained. In actual practice, the auxiliary waveform "A" may take on considerably more complex configurations than illustrated in FIG. 4.

When the control circuit 28 is activated, timing signals at the horizontal frequency rate are applied from the lead 31 and the timing signal circuit 30 to operate the switch 20 between its upper and lower positions in response to successive synchronizing pulses on the lead 31. This causes even-numbered lines, for example, to be applied through the upper output to the adder circuit 22 as shown in FIG. 3, and odd-numbered lines, for example, to be applied to the inverter 35, and through a one-horizontal line delay circuit 36 to a second input of the adder circuit 22. Thus, the inverted, even-numbered lines, delayed by one horizontal line period, arrive at the adder circuit 22 simultaneously with the odd-numbered lines applied directly from the output of the processing stages 18. This causes the auxiliary signal components "A" to be reinforced at the adder 22, and the video signal components "B" (FIG. 4) to be cancelled or subtracted from one another at the adder circuit 22.

The output of the adder 22 in the circuit of FIG. 3 then is applied through the variable gain amplifier 24, the gain of which is increased when the control circuit 28 is operated, as described previously. The amplifier 24 in turn supplies the more highly amplified signals to the cathode ray tube 26 for display. Now the signal reproduced when the control circuit is operated is the auxiliary signal displayed against a relatively grey background due to the cancelled normal video information.

Again, the control 28 may be activated in a number of different ways, as described previously. The operation of the circuit is not dependent upon how the control circuit is initially operated, or whether the control circuit is automatically rendered operataive or is operated only upon demand by the viewer.

The advantage of the circuit of FIG. 3, over the circuit disclosed in FIG. 1, is that the auxiliary signal information is displayed against a cancelled video background, whereas the auxiliary signal information of the circuit of FIG. 1 is displayed against a relativelly normal video background. In the circuit of FIG. 3, the use of a variable gain amplifier 24 is more advantageous that it is for the circuit of FIG. 1, since the video information is cancelled when auxiliary information is being displayed in the circuit of FIG. 3. Another advantage of the circuit of FIG. 3 is that the use of the one-horizontal line delay circuit 36 causes the reinforcement of the auxiliary signal and the cancellation of the video signals to take place electronically in the adder 22, and it is not necessary for the eye of the viewer to effect the necessary integration.

Figure 5:
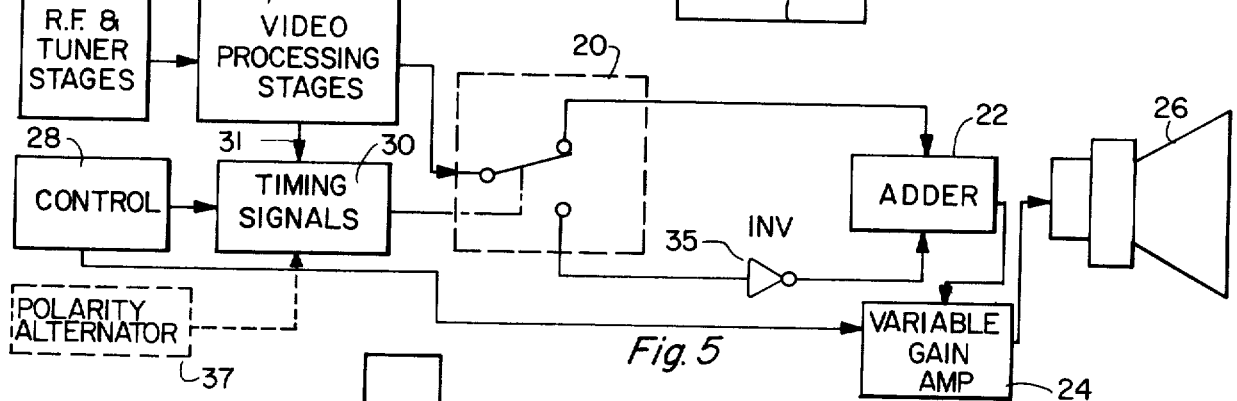
FIG. 5 is a block diagram of another embodiment of the invention.

In FIG. 5, another embodiment is illustrated which may be used in conjunction with signals of the type shown in FIG. 4 or with signals in which the auxiliary information is of opposite-polarity or phase in successive fields of the composite television signal rather than in successive lines. The circuit of FIG. 5 operates in the same manner as the circuit of FIG. 3. The one-horizontal line delay circuit 36, however, has been eliminated from the circuit of FIG. 5.

If the timing signals applied over the lead 31 to the timing signal circuit 30 are at the horizontal rate, the switch 20 of FIG. 5 is operated as in the circuit of FIG. 3 at the horizontal rate. The inverter 35 then inverts alternate lines of the received signal (which is of the type shown in FIG. 4) and applies them to the adder 22 when the circuit is being operated to display the auxiliary signals. In the circuit of FIG. 5, however, the eye of the viewer must perform the necessary integration to effect the cancellation of the video signal information and the reinforcement of the auxiliary signal information. This does not occur in actual practice, and the circuit of FIG. 5 does not require the rather long delay line 36 which is used in the circuit of FIG. 3. In all other respects, the circuits of FIG. 3 and 5 operate in the same manner.

If the synchronizing signal components applied over the lead 31 from the video processing stages 18 of the circuit shown in FIG. 5 are applied at the vertical synchronizing frequency rate (the frame or field rate), the switch 20 then operates between its upper or lower positions on every other field or frame of the received signal rather than on every other horizontal line. When the system of FIG. 5 is operated in this manner, the composite signal which is supplied to the video processing stages 18 and from the output thereof then has the form shown in the upper two lines of FIG. 6. The first field has the auxiliary signal portion "A" of one phase, and the next or alternate field has the auxiliary signal portion "A" of opposite phase. The fields repeat this pattern, with even-numbered fields having the auxiliary signal of one polarity and odd-numbered fields having the auxiliary signal "A" of opposite-polarity. The particular waveform which is illustrated in FIG. 6 is not necessarily the one actually used, but serves to illustrate the concepts which are employed.

So long as conventional video display is desired, the switch 20 is in the upper position as shown, and the alternate fields have the auxiliary signal of opposite phase; so that the eye of the viewer tends to integrate and cancel the auxiliary signal information while observing the normal or conventional video picture. When observance of the auxiliary signal information is desired, the control circuit 28 is operated, as described previously, causing the timing signal circuit 30 to operate the switch 20 between its upper and lower contacts on alternate fields, rather than on alternate horizontal lines as described previously. Thus, every other field (for example, the second field) is inverted and applied from the output of the inverter to the adder 22 in the form of the waveforms shown in the third line from the top in FIG. 6. These inverted fields are visually combined with the uninverted fields (the first fields), by the viewer to produce a visually reinforced auxiliary signal as shown in the bottom waveform of FIG. 6.

At the same time, the normal video information is inverted on alternate fields by the operation of the switch 20; so that it tends to cancel in the display on the cathode ray tube 26 with the eye of the viewer doing the necessary integration. The increase of the gain of the variable gain amplifier 24 when the auxiliary signals are to be displayed causes the relatively low level auxiliary signals to appear brighter on the cathode ray tube 26 than would otherwise occur if such increased gain were not provided.

The circuits which have been described above require the addition of a minimum number of components to a conventional television receiver to effect the capability of decoding and displaying auxiliary signal information. Typically, this auxiliary signal information is in the form of numbers, such as channel number identification, time, weather, or the like. To make the most effective use of the techniques which have been disclosed, the numbers of other indicia preferably should consist of horizontal and vertical strokes. This facilitates the redundancy and reinforcement of the auxiliary signal for effecting the auxiliary signal display. If indicia having diagonal lines in it is used in the auxiliary signal, there will be some shifting of the indicia when the auxiliary signal is displayed. This may not be objectionable, but it is preferable to use only horizontal and vertical strokes in the indicia, if possible.

It also should be noted that the auxiliary signal may be displayed on the entire face of the cathode ray tube or it may be arranged to be displayed in only a portion of the field, with the remainder of the field being utilized to display the conventional or normal television signal in the normal manner.

In FIG. 5, there is shown in dotted lines a circuit block identified as a polarity alternator 37, which has an output coupled to the timing signal circuit 30. The polarity alternator circuit 37 may be employed as an additional option in the circuits shown in FIGS. 3 and 5. In the display of the auxiliary signals, it is possible that the visually cancelled video background on the face of the cathode ray tube may be of such a nature that the auxiliary signal, even when it is enhanced and reinforced, may not be easily visible. For example, if the cancelled video background is a generally white background and the auxiliary signal is a white signal, the contrast between the two may not be sufficient to provide the desired degree of visibility of the auxiliary signal when its display is demanded. A similar problem exists with the display of a black auxiliary signal on a dark background. This problen can be overcome by adding a polarity alternator circuit 37 as indicated in FIG. 5.

The polarity alternator circuit 37 causes additional timing pulses to be applied to the timing circuit 30 to reverse the phase of the switch 20 upon the application of each output pulse from the polarity alternator circuit 37. The pulses applied to the timing signal circuit 30 from the polarity alternator circuit 37 are of a much lower frequency or rate than the synchronizing signals applied to the circuit 30 over the lead 31 from the video processing stages 18. These additional pulses, which cause additional switching of the switching circuit 20, can be considered from two different aspects that produce an equivalent effect; that is, the pulses from the polarity alternator circuit 37 force the switch 20 to repeat or stay at the same location for two counts, or the polarity alternator signals force the switch 20 to make an extra count. In either event, this has the effect of alternately inverting the polarity of the displayed auxiliary signal produced by the circuit of FIGS. 3 and 5. If this is done at a low frequency rate (typically 1-10 hertz), the effect is to cause auxiliary information displayed on the cathode ray tube to flash from whiter than the background to darker than the background at half the rate of the signals applied from the polarity alternator circuit 37. This flashing causes the auxiliary signal to become more obvious to the viewer and increases the contrast.

In addition, such switching or alternate inverting of the polarity of the auxiliary signal eliminates the problem of visibility on a white or black background. The pulses from the polarity alternator circuit 37 preferably are in synchronism with the vertical synchronizing signals from the video processing stages 18. This can be accomplished by utilizing the output from the vertical stages of the circuit 18 and applying that output through a simple vertical countdown circuit to obtain the desired switching rate. Such synchronism, however, is not necessary; and a simple low frequency RC oscillator may be employed in the polarity alternator circuit 37 to produce the desired effect.

Another alternative to causing the auxiliary signal display to be more readily visible when it is selected by operation of the control circuit 28, is to cause each of the display indicia to be displayed as contiguous black and white elements or by displaying the indicia as either white or black on an opposing background. The operation of the circuits of the embodiments shown in FIGS. 1, 3 and 5 would not be changed for displays having these two separate parts.

It also will be apparent to those skilled in this art that the circuit of FIG. 5 can be used with an auxiliary signal that inverts phase every $n$ horizontal lines, where $n$ is any integer. Of course, the operation of the switch 20 must be synchronized with the phase reversals of the auxiliary signal to effect proper display of the auxiliary signal when desired.

In addition, there may be some applications where the auxiliary signal is added locally at the receiver by operation of the control circuit 28. The system operation, however, would be the same as for the systems described above.

We claim:

1. A television receiver for selectively displaying conventional television signals and auxiliary television signals on the cathode ray tube thereof, wherein the conventional television signals comprise a composite signal containing at least video information and horizontal and vertical synchronizing signal components, and said auxiliary signal components comprise alternating signal portions containing opposite-polarity, redundant information during successive ones of the signal portions thereof, said receiver including in combination:

means for simultaneously processing a combined signal comprising said conventional signals and said auxiliary signal components for producing a video signal to be displayed on the cathode ray tube of the receiver wherein the redundant and opposite polarity portions of said auxiliary signal are substantially visually cancelled from the display on said cathode ray tube;

selectively operated switching circuit means responsive to at least some of the synchronizing signal components of the composite television signal for processing said combined signal to cause the redundant auxiliary signal portions to be visually reinforced so that the auxiliary signal components are reproduced on said cathode ray tube; and control means for selectively initiating operation of said switching circuit means.

2. The combination according to claim 1 wherein said switching circuit means further causes the conventional video information to be substantially visually cancelled when said auxiliary signal components are reproduced on the cathode ray tube.

3. The combination according to claim 2 further including means for increasing the gain of signals applied to the cathode ray tube in response to operation of said control means to initiate operation of said switching circuit means.

4. The combination according to claim 1 wherein the alternating signal portions of said auxiliary signal comprise signal portions of a predetermined frequency $f$ with the signals in the even-numbered horizontal lines thereof comprising first signal portions of said auxiliary signal, and the signals in the odd-numbered horizontal lines comprising second signal portions of said auxiliary signal, the first signal portions being out of phase with the second signal portions of said auxiliary singal by one-half period of the signal frequency $f$; said switching circuit means includes delay means having a delay length equal to said one-half period of signal frequency $f$ and means for alternately applying said combined signal to the cathode ray tube circuit directly for alternating horizontal lines of such signal and through said delay means for the remaining horizontal lines.

5. The combination according to claim 4 wherein said switching circuit means, when operated, responds to horizontal synchronizing pulses.

6. The combination according to claim 1 wherein the signal portions of said auxiliary signal in successive fields of said combined signal contain intentionally redundant and opposite-polarity information, and said switching circuit means, when operated, responds to vertical synchronizing signal components for inverting alternating fields of said combind signal to cause the conventional video information displayed on the cathode ray tube to substantially cancel and said auxiliary signal portions to be reinforced and displayed on said cathode ray tube.

7. The combination according to claim 1 wherein said alternating signal portions of the auxiliary signal components comprise alternating lines of said combined signal in which successive lines thereof have auxiliary signal components which are redundant and of opposite polarity; said combination further including an inverter coupled with said cathode ray tube; and said control means operating in conjunction with the horizontal synchronizing signal components of the composite signal for selectively initiating operation of said switching circuit means to apply the combined signal to said cathode ray tube circuit directly on alternate horizontal lines and through said inverter means on the remaining horizontal lines for effectively inverting the polarity of said combined signal during every other time successive line interval, thereby causing said auxiliary information signal to be visually reinforced and displayed and the conventional video signal information to be visually cancelled from the display on the cathode ray tube.

8. The combination according to claim 7 further including delay means connected in series with said inverter means for imparting a delay of one horizontal line interval to signal passing therethrough.

* * * * *